United States Patent
Lim et al.

(10) Patent No.: US 8,094,720 B2
(45) Date of Patent: Jan. 10, 2012

(54) MODE DECISION FOR INTER PREDICTION IN VIDEO CODING

(75) Inventors: Keng Pang Lim, Singapore (SG); Dajun Wu, Singapore (SG); Si Wu, Singapore (SG); Susanto Rahardja, Singapore (SG); Feng Pan, Singapore (SG); Xiao Lin, Singapore (SG); Zhengguo Li, Singapore (SG)

(73) Assignee: Agency for Science Technology and Research, Centros (SG)

( * ) Notice: Subject to any disclaimer, the term of this patent is extended or adjusted under 35 U.S.C. 154(b) by 1225 days.

(21) Appl. No.: 10/569,263

(22) PCT Filed: Aug. 25, 2004

(86) PCT No.: PCT/SG2004/000256
§ 371 (c)(1),
(2), (4) Date: Oct. 10, 2006

(87) PCT Pub. No.: WO2005/020588
PCT Pub. Date: Mar. 3, 2005

(65) Prior Publication Data
US 2007/0140337 A1    Jun. 21, 2007

Related U.S. Application Data

(60) Provisional application No. 60/497,598, filed on Aug. 25, 2003, provisional application No. 60/526,059, filed on Dec. 1, 2003.

(51) Int. Cl.
*H04N 7/12* (2006.01)
*H04N 11/02* (2006.01)
*H04N 11/04* (2006.01)

(52) U.S. Cl. ......... 375/240.13; 375/240.01; 375/240.02; 375/240.12; 375/240.16

(58) Field of Classification Search . 375/240.12–240.16
See application file for complete search history.

(56) References Cited

U.S. PATENT DOCUMENTS

| | | | |
|---|---|---|---|
| 6,188,728 B1 * | 2/2001 | Hurst | 375/240.16 |
| 6,639,942 B1 * | 10/2003 | Bayazit | 375/240.01 |
| 2001/0019586 A1 * | 9/2001 | Kang et al. | 375/240.16 |
| 2003/0048955 A1 * | 3/2003 | Pardas et al. | 382/243 |
| 2003/0202590 A1 * | 10/2003 | Gu et al. | 375/240.13 |

FOREIGN PATENT DOCUMENTS

| | | |
|---|---|---|
| EP | 1 389 875 A2 | 8/2003 |
| WO | WO 99/26416 | 5/1999 |
| WO | WO 02/077920 | 10/2002 |

OTHER PUBLICATIONS

U.S. Appl. No. 60/451,553.

(Continued)

*Primary Examiner* — Christopher S Kelley
*Assistant Examiner* — Chikaodili E Anyikire
(74) *Attorney, Agent, or Firm* — Stephen A. Bent; Foley & Lardner LLP

(57) ABSTRACT

A method for inter-mode prediction in video coding, the method comprising checking a data block of an image for zero motion; computing frame difference of the data block based on the checking for zero motion; and making an inter-mode prediction selection based on the computed frame difference.

16 Claims, 3 Drawing Sheets

OTHER PUBLICATIONS

First Office Action CN Application No. 200480027851.X.
Office Action JP 2006-524606 dated Jul. 13, 2010.
Toshio Uchiyama et al., "Estimation of Homogeneous Regions for Segmentation of Textured Images", IEEE Proceedings in Pattern Recognition, 2000, pp. 1072-1075.
Xiuwen Liu et al., "Image Segmentation Using Local Spectral Histograms", IEEE International Conference on Image Processing 2001, pp. 70-73.
Feng Pan et al., "Fast Mode Decision Algorithm for Intra Prediction in JVT", G013 64 $^{TH}$ JVT meeting, Pattaya, Mar. 2003.
Berthold K.P. Horn et al., "Determinating Optical Flow", Artificial Intelligence 17:185-203, 1981.
Zhibo Chen et al., "Fast Integer Pel and Fractional Pel Motion Estimation for JVT" Joint Video Team (JVT) of ISO/IEC MPEG & ITU-T VCEG 6th Meeting: Awaji Island JP Dec. 5-13, 2002, pp. 1-13.

* cited by examiner

MODE DECISION FOR INTER PREDICTION IN VIDEO CODING

This application is a national stage of PCT/SG2004/000256 filed Aug. 25, 2004, which is based on U.S. Provisional Application Nos. 60/497,598, filed Aug. 25, 2003 and 60/526,059, filed Dec. 1, 2003, all of which are incorporated herein by reference in their entirety.

FIELD OF INVENTION

This invention relates to video coding, video compression, video communication, video signal processing, image processing, pattern recognition and computer vision, in particularly, H.264 advanced video coding

BACKGROUND

Proponents of an emerging video codec, H.264, are predicting that the scheme will enable the delivery of Internet Protocol-based broadcast-quality video at data rates of less than 1 Mbit/second. Although demand for H.264 may not hit volume before 2004, the codec is gaining rapid recognition by the broadcasting industry and has gone way far enough that MPEG-4, long pitched as the logical interactive enhancement to MPEG-2, could be lost in the shuffle. H.264 proponents also comment that the codec's ability to reduce bandwidth by 50 percent or more has the potential to permit phone companies to deliver broadcast-quality video without revamping their infrastructure. H.264 could enable cable and satellite operators to offer more channels, while letting consumers store twice as many programs in personal video recorders or to record high-definition movies on DVD recorders.

Typically, a H.264 16×16 macroblock consists of four types of macroblocks of one size 110 and four subtypes of macroblock of another size 120 as shown in FIG. 1. The four subtype blocks 120 are part of a P8×8 type macroblock 107. The four macroblock type sizes 110 include a 16×16 type macroblock 101, a 16×8 type macroblock 103, a 8×16 type macroblock and a P8×8 type macroblock 107. The four subtypes include a 8×8 subtype 109, a 8×4 subtype 111, a 4×8 subtype 113 and a 4×4 subtype 115.

Conventionally, motion estimation is performed for every block, regardless of the size. Encoding of each block follows motion estimation. The best size of the block is determined by finding the block size that gives the best rate-distortion performance as shown in FIG. 2.

As seen In FIG. 2, a fast motion estimation for each of 16×16, 16×8 and 8×16 macroblock type (101, 103, 105) are performed at step 201. At step 203, the different sizes are encoded and the results of the best rate distortion are stored. At step 205, the fast motion estimation is performed for each of the four (8×8, 8×4, 4×8, 4×4) subtype macroblocks (109, 111, 113, 115). At step 207, the different 8×8 subtype macroblocks are encoded and the results of the best rate distortion are stored. At step 209, the mode that gives the best rate distortion is chosen from the stored results from the three 16×16, 16×8, 8×16 macroblocks (101, 103, 105) and the four subtypes (109, 111, 113, 115).

It is evident that inter-mode determination can be an extremely time consuming process given that twenty-one motion estimations have to be performed to find the motion vector for each variable-sized block. Furthermore, only the motion vectors belonging to the best size blocks are used and the rest of the motion vectors are discarded at the end, resulting in a waste of computational resources.

The present invention, in at least preferred embodiments, seeks to provide a fast encoding technique to meet this demand and to satisfy the industry's need.

SUMMARY

In accordance with a first aspect of the present invention there is provided a method for inter-mode prediction in video coding, the method comprising:
  checking a data block of an image for zero motion;
  computing frame difference of the data block based on the checking for zero motion; and
  making an inter-mode prediction selection based on the computed frame difference.
The method may further comprise the steps of:
  checking a homogeneity of the data block, and
  making the inter-mode prediction selection based on the checking of the homogeneity of the data block.
Making the inter-mode prediction selection may further be based on the checking of the homogeneity of the data block further comprises making the inter-mode selection based on intra-mode prediction selection.
The intra-mode prediction selection may comprise a vertical versus horizontal intra-mode prediction selection.
The vertical versus horizontal intra-mode prediction selection may comprise generating edge directional information of the image, and detecting the direction of one or more edges of the image.
The intra-mode prediction selection may be conducted prior to checking the data block of the image for zero motion.
The method may further comprise making the inter-mode prediction selection further based on checking of the homogeneity of subtypes of the data block.
The method may further comprise performing motion estimation on different selected block sizes based on the inter-mode prediction selection.
The method may further comprise performing rate distortion optimization on different selected block sizes based on the inter-mode prediction selection.
The checking the data block for zero motion may comprise checking if a collocated previous data block has zero motion vector.
In accordance with a second aspect of the present invention there is provided a system for inter-mode prediction in video coding, the system comprising:
  a motion detection unit checking a data block of an image for zero motion; and
  a processor unit computing frame difference of the data block based on the checking for zero motion; and making an inter-mode prediction selection based on the computed frame difference.
The system may further comprise a homogeneity detection unit
  checking a homogeneity of the data block, and
  the processor unit may further make the inter-mode prediction selection based on the checking of the homogeneity of the data block.
In making the inter-mode prediction selection based on the checking of the homogeneity of the data block, the processor unit may further make the inter-mode selection based on intra-mode prediction selection.
The intra-mode prediction selection may comprise a vertical versus horizontal intra-mode prediction selection.
The vertical versus horizontal intra-mode prediction selection may comprise generating edge directional information of the image, and detecting the direction of one or more edges of the image.

The system may further comprise making the inter-mode prediction selection based on checking of the homogeneity of subtypes of the data block by the homogeneity detection unit.

The processor unit may further perform motion estimation on different selected block sizes based on the inter-mode prediction selection.

The processor unit may further perform rate distortion optimization on different selected block sizes based on the inter-mode prediction selection.

The motion detection unit may check if a collocated previous data block has zero motion vector to check the data block for zero motion.

In accordance with a third aspect of the present invention there is provided a data storage medium having stored thereon computer readable code means for instructing a computer to execute a method for inter-mode prediction in video coding, the method comprising:

checking a data block of an image for zero motion;

computing frame difference of the data block based on the checking for zero motion; and making an inter-mode prediction selection based on the computed frame difference.

The method may further comprise the steps of:

checking a homogeneity of the data block, and making the inter-mode prediction selection based on the checking of the homogeneity of the data block.

The method may further comprise making the inter-mode prediction selection based on checking of the homogeneity of subtypes of the data block by the homogeneity detection unit.

The checking the data block for zero motion may comprise checking if a collocated previous data block has zero motion vector.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

As described above, in H.264, there are altogether 7 different block sizes (16×16, 16×8, 8×16, 8×8, 8×4, 4×8 and 4×4 blocks) that are used in a macroblock (16×16 block). Motion estimation and Rate Distortion Optimisation (RDO) are performed to find the best block sizes in the macroblock resulting in heavy computational load at the encoder. If the block size is predicted accurately, there will be significant time savings for the motion estimation and RDO computations.

It is observed that when video objects move, the various parts of the video objects move together. The "spatial smoothness of motion" arises from this observation and has been conventionally used in data compression. From observations, homogeneous regions in natural or synthetic video sequences probably belong to the same video object and thus move together as well. One of the main reasons for using variable block sizes in H.264 is to represent motion of video objects more adequately. Since homogeneous regions tend to move together, homogeneous blocks in the frame should have similar motion and should not be split further into smaller blocks. To avoid further computation for splitting the blocks, the detection of homogeneous blocks in the example embodiment involves the following steps;

1) Detection of homogeneous blocks.

2) If the blocks are homogeneous, use the algorithm disclosed herein in the example embodiment.

3) Proceed with the RDO optimization to find the best block size.

Figure 1:
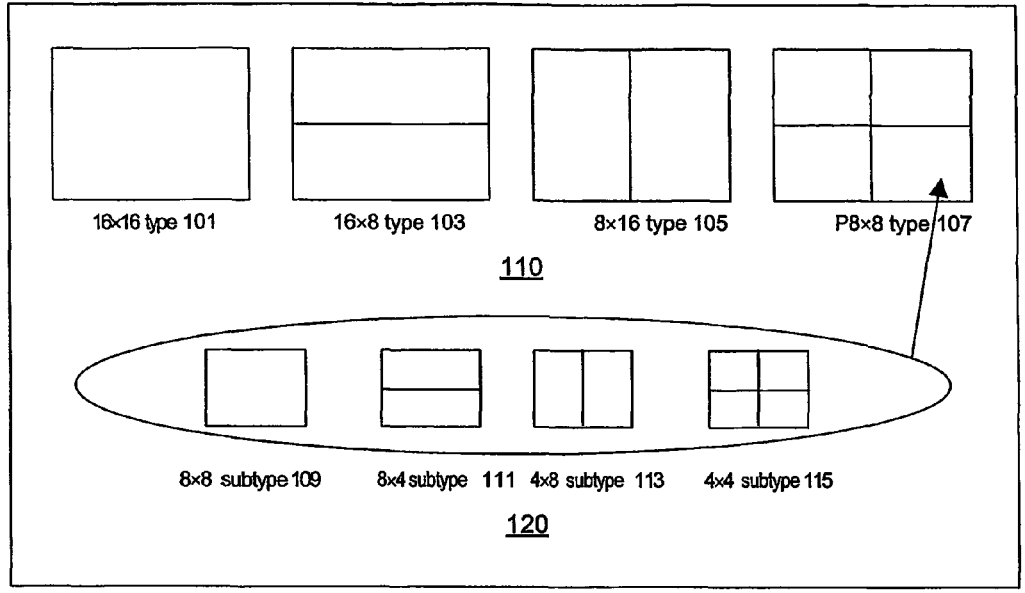
FIG. 1 is a block diagram of different macroblock types used in H.264.
Figure 2:
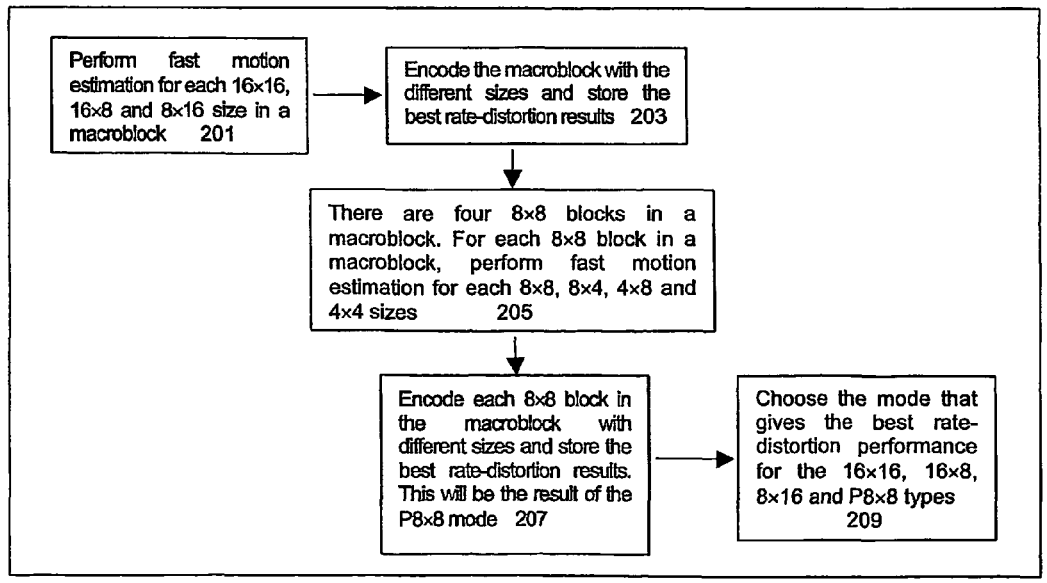
FIG. 2 is a diagram showing the steps in determining the best inter-mode through rate distortion optimisation.
Figure 3:
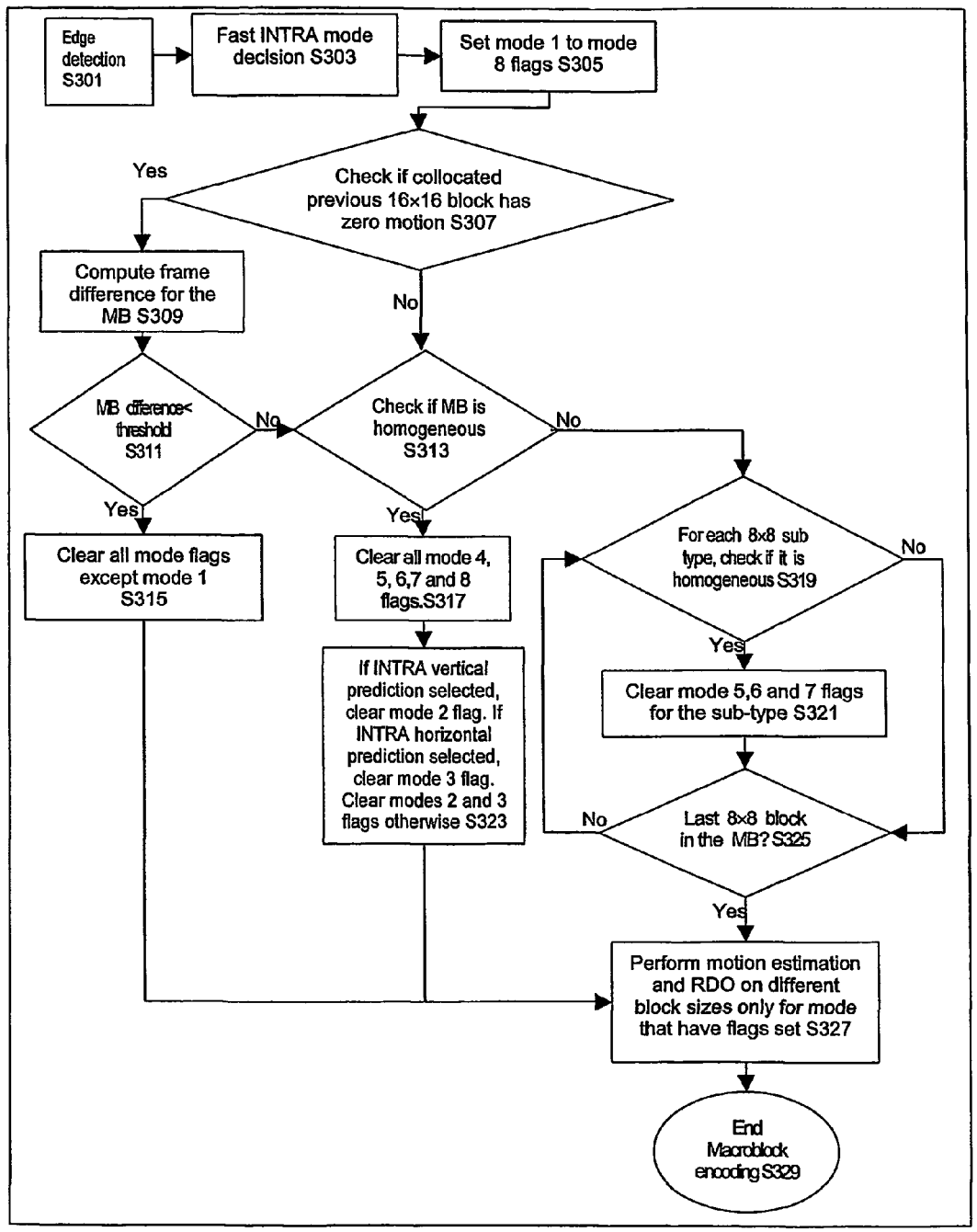
FIG. 3 is flow chart showing an embodiment of a fast inter-mode algorithm.

Referring to FIG. 3, after checking that the previous collocated 16×16 block is found to have zero motion vector and prediction error less than a fixed threshold value, the current macroblock will be considered as 16×16 macroblock type and RDO computations are skipped entirely.

When a 16×16 block is detected as homogeneous block (step S313), a 16×16 block size is chosen, and ,in addition, 16×8 or 8×16 block sizes are also considered (step 323). Details of step S323 will be described below. The reason for including RDO computation on 16×8 or 8×16 blocks structure is to cater for a situation when the codec cannot find a good prediction of the 16×16 homogeneous block from the previous frames. Note however, that these occurrences are very minimal since most homogeneous regions do not split into smaller block sizes after RDO. The selection of 16×8 or 8×16 block depends on the results of fast intra mode decision methods in the example embodiment. If the selected intra mode is vertical prediction, a 8×16 block is used in addition to 16×16. If the selected mode is horizontal prediction, a 16×8 block is used instead, in addition to 16×16. Otherwise, only 16×16 block is used.

When a 8×8 block is detected as homogeneous region, the final selected size is simply 8×8 block, skipping the RDO computations for the 8×4, 4×8 and 4×4 block sizes.

Besides making use of the spatial characteristics, the stationary characteristics of video objects are exploited as well. When video objects stop moving, there is a very high tendency that it is 16×16 block. Therefore, if the collocated 16×16 block from the previous frame is found to be zero motion, the macroblock difference is computed. If it is small, only 16×16 block size is used.

FIG. 3 shows the detailed steps of an example embodiment. There are eight flags for each of the different sizes of macroblocks. When a flag is set, it denotes that the corresponding block size will be used. The modes are defined as follows:

TABLE 1

| o. | Mode | Descriptions |
|---|---|---|
| | 1 | 16 × 16 block |
| | 2 | 16 × 8 block |
| | 3 | 8 × 16 block |
| | 4 | 8 × 8 block |
| | 5 | 8 × 4 block |
| | 6 | 4 × 8 block |
| | 7 | 4 × 4 block |
| | 8 | P8 × 8 block |

At step 301, a Sobel edge operator is used to detect and generate the edge map of the image using equation (1). An histogram of the edge direction is generated for use in fast INTRA mode decision step at step S303.

At step 305 flags are set for the eight different modes indicated in Table 1. At step S307, a check is done if the collocated previous 16×16 block has zero motion vector. If step S307 result in "no", step S313 is done to check if the macroblock is homogeneous.

If step S307 results in "yes", the frame difference of the macroblock is computed at step S309 if the frame difference of the macroblock is greater than the threshold $Thd_{diff}$ (step S311), a check is done to determine if the macroblock is homogeneous at step S313.

If the frame difference of the macroblock is less than the threshold $Thd_{diff}$, all mode flags are cleared except for mode 1 (shown in Table 1). Subsequently, a motion estimation is performed on the 16×16 macroblock and it is encoded. Proceed to code another macroblock At step 313, a calculation of the macroblock is made to check if it is homogeneous by Computing $H_{n,m}$ in equation (3).

At step 313, if the macroblock is homogeneous, the H.264 encoder performs RDO on the 16×16 and, optionally (refer step S323), 16×8 or 8×16 block. Other computations for the different sizes (modes 4, 5, 6, 7, 8 of Table 1) are skipped at step s317 and the best mode is chosen from the modes just computed.

The selection of 16×8 or 8×16 block depends on the results of fast intra mode decision at step S323. If the selected intra mode is vertical prediction, the 8×16 block size is in addition to 16×16 block size. If the selected mode is horizontal prediction, the 16×8 block size is used instead, in addition to 16×16 block size. Otherwise, only 16×16 block size is used. At step S327, RDO and motion estimation is performed on the chosen block size(s). The results for the best mode are saved. The one with the lowest RDO cost will be selected as the chosen mode size.

At step S313, if the macroblock is non-homogeneous, for each 8×8 block, a check is done at step S319 to determine if it is homogeneous by computing the equation (3). Flags 1, 2, and 3 are cleared when moving form step S313 to S319.

If the check at S319 results in "no", at step S325 a check is made to determine if all the four 8×8 blocks in the macroblock have been computed. If the check at step S325 results in "no", then step S319 is performed for the next 8×8 block. If the check at step S325 results in "yes", then at step S327 motion estimation and RDO are performed on the respective macroblock types and subtype(s) that have their flags set.

If the check at S319 results in "yes", at step S321 mode 5, 6, 7 flags are cleared for that particular 8×8 block. Then at step S325, a check is made to determine if all the four 8×8 blocks in the macroblock have been processed. If the check at step S325 results in "no", then step S319 is performed for the next 8×8 block. If the check at step S325 results in "yes", then at step S327 motion estimation and RDO are performed on the respective macroblock types and subtype(s) which have their flags set.

The above steps are integrated into the inter-mode prediction functional block which are executed by the H.264 encoder to perform the appropriate macroblock encoding.

The values of $Thd_H$ and $Thd_{diff}$ are fixed or adaptive to the quantisation parameter. By adapting the threshold value to the quantisation parameter, the time savings are improved and there is no drop in video quality performance from low to high bitrates compared to fixed threshold value. The bitrate is not increased either. The computation of the threshold is as follows:

$$Thd = \lambda_1(5/16 + 3/128 QP)$$

Where QP is the quantization parameter. When $Thd=Thd_H$, the typical value of $\lambda_1$ is 19000 for 16×16 block and 200 for 8×8 block. When $Thd=Thd_{diff}$, the typical value of $\lambda_1$ is 190.

A region is homogeneous if the textures in the region have very similar spatial property. The simplest method is to gauge the texture property by using statistical measurement such as standard deviation, variance, skewness and kurtosis. A texture may even be modeled using Gaussian Markov Random Field. The different textures may also labelled separately using a hypothesis-and-test-based method on variable window sizes of the textures, which is very effective, but is computationally intensive and may reduce the overall speed gain in performing the fast inter-mode decision.

In the example embodiment, homogeneous regions are detected effectively, efficiently-and rapidly.

The example embodiment employs an edge detection method, which is used for fast intra mode decision technique. The fast intra mode decision is used to speed up the encoding time during inter reference frame coding. The pre-computation for detecting homogeneous regions will be reduced since it is already computed prior to fast intra mode decision.

In the example embodiment, an edge map is computed in fast intra mode decision technique by using Sobel operator in the vertical and horizontal directions. For a pixel $P_{i,j}$, $i \in 1, 2, \ldots, N, j \in 1, 2, \ldots, M$ in a image frame of size N rows by M columns, the corresponding edge vector, $\vec{D}_{i,j} = \{dx_{i,j}, dy_{i,j}\}$, is computed as follows:

$$dx_{i,j} = P_{i-1,j+1} + 2 \times P_{i,j+1} + P_{i+1,j+1} - P_{i-1,j-1} - 2 \times P_{i,j-1} - P_{i+1,j-1}$$

$$dy_{i,j} = P_{i+1,j-1} + 2 \times P_{i+1,j} + P_{i+1,j+1} - P_{i-1,j-1} - 2 \times P_{i-1,j} - P_{i-1,j+1} \quad (1)$$

where $dx_{i,j}$ and $dy_{i,j}$ represent the degree of difference in vertical and horizontal directions respectively. The amplitude of the edge vector is computed by, $$Amp(\vec{D}_{i,j}) = |dx_{i,j}| + |dy_{i,j}| \quad (2)$$

This is to determine if a block is homogeneous using the pre-computed amplitude (Amp) of the edge vector in fast intra mode decision. If the sum of the magnitude of the edge vector at all pixel location in a block is less than $Thd_H$, it is classified as homogeneous block, otherwise, it is non-homogeneous. If n and m refers to the index of the row and column of the macroblock, $MB_{n,m}$, then:

$$H_{n,m} = \begin{cases} 1 & \sum_{i,j \in \text{positions in the macroblock}} Amp(\vec{D}_{i,j}) < Thd_H \\ 0 & \sum_{i,j \in \text{positions in the macroblock}} Amp(\vec{D}_{i,j}) \geq Thd_H \end{cases} \quad (3)$$

where $H_{n,m}=1$ indicates that the macroblock $MB_{n,m}$, is a homogeneous block and is non-homogeneous otherwise. It must be emphasized that the computation is already done prior to fast intra mode decision and the only additional task at this stage is the addition operations in equation (3).

The fast INTER mode prediction was implemented into version JM5.0c encoder. The fast motion estimation algorithm used is from JVT-F017 and the fast INTRA prediction technique is from JVT-G013. The results of the fast inter-mode selection algorithm as described in the example embodiment (involving fast motion estimation, fast INTRA+ fast INTER) with the existing systems (fast motion estimation+fast INTRA).

The test conditions are as follows:

| | |
|---|---|
| 1) | Hadamard transform is used. |
| 2) | RD optimization is enabled. |
| 3) | Reference frame number equals to 5. |

-continued

4) CABAC is enabled.
5) MV resolution is ¼ pixel.
6) ABT mode is disabled.
7) GOP structure is IPPP or IPBPB.
8) The number of frames in a sequence is 150.

A group of experiments were carried out on the test sequences with the 4 quantization parameters, i.e., QP=28, 32, 36, and 40. The results are tabulated according to Tables 2 to Table 9.

PCHG represents the changes of average PSNR for the whole video sequence. BINC represents the average bitrate increment for the whole sequence. TSAV represents the time saving in coding time for the whole sequence in percentage.

TABLE 2

Test Condition Video Sequences Comparisons (QP = 28, IPPP)

| Sequences | GOP structure | PCHG (dB) | BINC (%) | TSAV (%) |
|---|---|---|---|---|
| Stefan | IPPP | −0.02 | 0.23 | 19.38 |
| Silent | IPPP | −0.08 | 0.88 | 50.00 |
| News | IPPP | −0.05 | 0.59 | 46.88 |
| Mobile | IPPP | −0.01 | −0.01 | 10.96 |
| Container | IPPP | −0.01 | 0.56 | 47.52 |
| Foreman | IPPP | −0.06 | 0.93 | 27.03 |
| Paris | IPPP | −0.04 | 0.73 | 34.73 |

TABLE 3

Test Condition Video Sequences Comparisons (QP = 32, IPPP)

| Sequences | GOP structure | PCHG (dB) | BINC (%) | TSAV (%) |
|---|---|---|---|---|
| Stefan | IPPP | −0.02 | 0.04 | 17.18 |
| Silent | IPPP | −0.01 | 0.33 | 49.51 |
| News | IPPP | −0.03 | 0.77 | 43.96 |
| Mobile | IPPP | −0.01 | −0.02 | 10.04 |
| Container | IPPP | −0.01 | −0.60 | 44.09 |
| Foreman | IPPP | −0.05 | 0.47 | 25.93 |
| Paris | IPPP | −0.02 | 0.59 | 33.49 |

TABLE 4

Test Condition Video Sequences Comparisons (QP = 36, IPPP)

| Sequences | GOP structure | PCHG (dB) | BINC (%) | TSAV (%) |
|---|---|---|---|---|
| Stefan | IPPP | −0.01 | −0.11 | 16.70 |
| Silent | IPPP | 0 | −0.18 | 43.00 |
| News | IPPP | −0.06 | 0.28 | 41.38 |
| Mobile | IPPP | 0.01 | 0.17 | 9.26 |
| Container | IPPP | −0.03 | 0.22 | 37.65 |
| Foreman | IPPP | 0 | 0.56 | 24.76 |
| Paris | IPPP | −0.02 | 0.04 | 31.25 |

TABLE 5

Test Condition Video Sequences Comparisons (QP = 40, IPPP)

| Sequences | GOP structure | PCHG (dB) | BINC (%) | TSAV (%) |
|---|---|---|---|---|
| Stefan | IPPP | 0.01 | 0.27 | 16.02 |
| Silent | IPPP | 0.01 | 0.00 | 37.50 |
| News | IPPP | −0.04 | −0.93 | 37.65 |
| Mobile | IPPP | 0 | 0.28 | 9.54 |
| container | IPPP | −0.01 | 0.62 | 36.25 |
| Foreman | IPPP | −0.04 | 0.27 | 22.77 |
| Paris | IPPP | −0.03 | 0.12 | 27.72 |

TABLE 6

Test Condition Video Sequences Comparisons (QP = 28, IBBP)

| Sequences | GOP structure | PCHG (dB) | BINC (%) | TSAV (%) |
|---|---|---|---|---|
| Stefan | IBBP | −0.01 | 0.33 | 18.44 |
| Silent | IBBP | −0.07 | 1.44 | 49.12 |
| News | IBBP | −0.06 | 0.76 | 43.81 |
| Mobile | IBBP | −0.02 | 0.03 | 10.19 |
| Container | IBBP | −0.01 | −0.80 | 43.52 |
| Foreman | IBBP | −0.08 | 1.37 | 28.23 |
| Paris | IBBP | −0.08 | 0.67 | 28.88 |

TABLE 7

Test Condition Video Sequences Comparisons (QP = 32, IBBP)

| Sequences | GOP structure | PCHG (dB) | BINC (%) | TSAV (%) |
|---|---|---|---|---|
| Stefan | IBBP | −0.01 | −0.06 | 16.20 |
| Silent | IBBP | −0.04 | 0.52 | 46.79 |
| News | IBBP | −0.03 | −0.02 | 41.84 |
| Mobile | IBBP | −0.01 | 0.04 | 9.07 |
| Container | IBBP | −0.01 | −0.83 | 40.82 |
| Foreman | IBBP | −0.03 | 0.84 | 27.12 |
| Paris | IBBP | −0.02 | 0.79 | 27.52 |

TABLE 8

Test Condition Video Sequences Comparisons (QP = 36, IBBP)

| Sequences | GOP structure | PCHG (dB) | BINC (%) | TSAV (%) |
|---|---|---|---|---|
| Stefan | IBBP | −0.02 | 0.25 | 15.45 |
| Silent | IBBP | −0.01 | 0.52 | 45.71 |
| News | IBBP | 0.04 | 0.87 | 38.71 |
| Mobile | IBBP | −0.01 | −0.72 | 8.85 |
| Container | IBBP | −0.02 | −0.73 | 35.96 |
| Foreman | IBBP | 0.02 | 0.73 | 25.66 |
| Paris | IBBP | −0.01 | 0.04 | 25.90 |

TABLE 9

Test Condition Video Sequences Comparisons (QP = 40, IBBP)

| Sequences | GOP structure | PCHG (dB) | BINC (%) | TSAV (%) |
|---|---|---|---|---|
| Stefan | IBBP | 0.00 | −0.25 | 14.87 |
| Silent | IBBP | −0.01 | −0.25 | 41.58 |
| News | IBBP | −0.02 | 0.07 | 37.08 |
| Mobile | IBBP | 0.00 | −0.08 | 8.66 |
| Container | IBBP | 0.00 | 0.00 | 34.52 |
| Foreman | IBBP | −0.06 | −1.49 | 24.30 |
| Paris | IBBP | −0.01 | −0.26 | 23.43 |

From the experimental result, it is obseveed that the invention as defined by the example embodiment has reduce the encoding time by 30% on average. It has shown consistent gain in speed for all video sequences with the least gain of 8.66% in mobile viedo sequence and most gain of 50% in silent video sequence. The PSNR loss is negligible with the highiest loss at 0.08 dB. The bitrate increase is also negligible with the highiest increase at 1.44%.

From the experiment shown above, a fast INTER mode decision technique that make use of the homogeneity of video object's textures and temporal characteristics in video sequences. The new technique is able to achieve a reduction of 30% encoding time on average, with a negligible average PSNR loss of 0.02 dB and 0.2% bitrate increase.

Figure 4:
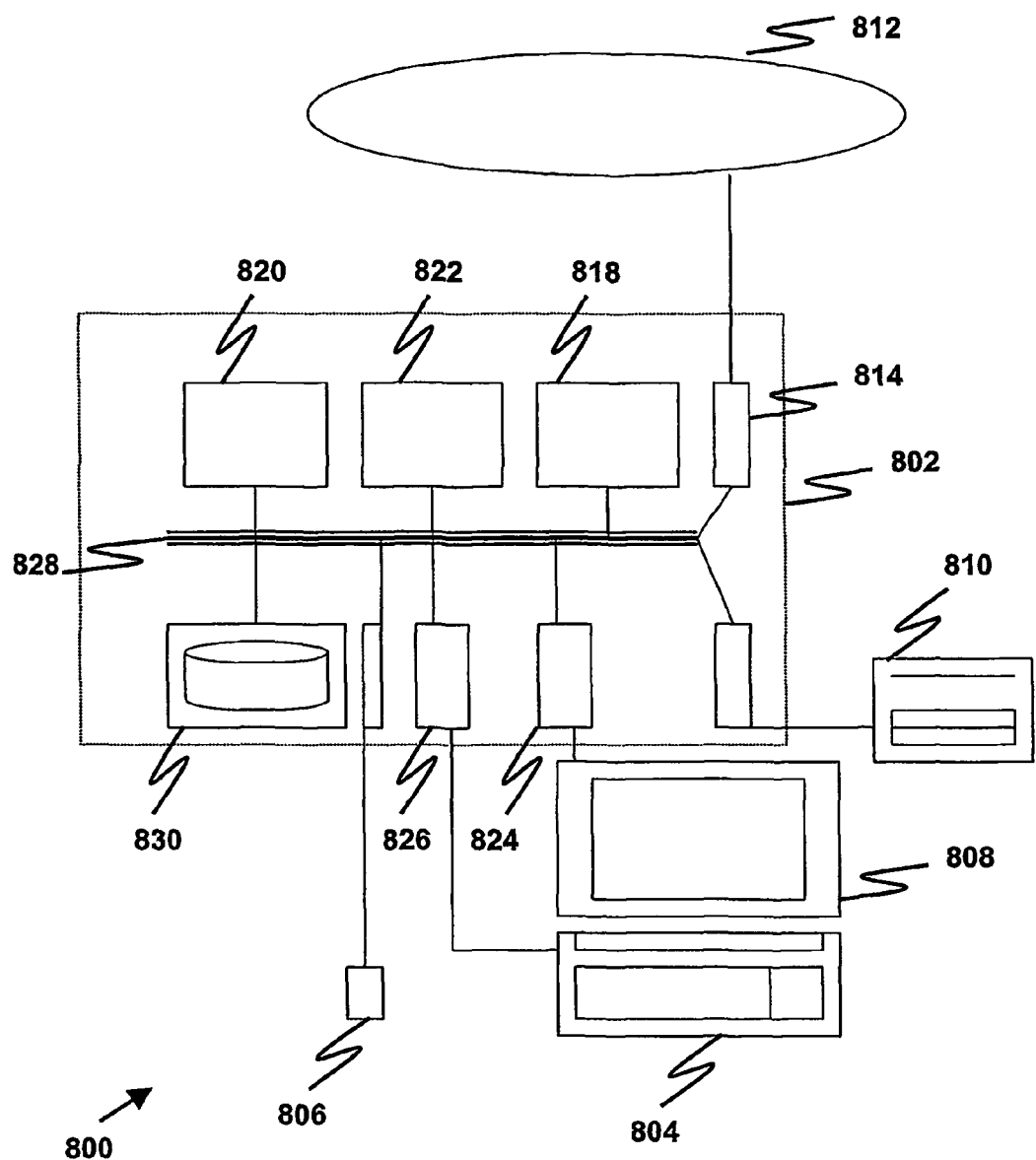
FIG. 4 is a schematic drawing illustrating a computer system for implementing a method and system according to an embodiment.

The method and system of the example embodiment can be implemented on a computer system 800, schematically shown in FIG. 4. It may be implemented as software, such as a computer program being executed within the computer system 800, and instructing the computer system 800 to conduct the method of the example embodiment.

The computer system 800 comprises a computer module 802, input modules such as a keyboard 804 and mouse 806 and a plurality of output devices such as a display 808, and printer 810.

The computer module 802 is connected to a computer network 812 via a suitable transceiver device 814, to enable access to e.g. the Internet or other network systems such as Local Area Network (LAN) or Wide Area Network (WAN).

The computer module 802 in the example includes a processor 818, a Random Access Memory (RAM) 820 and a Read Only Memory (ROM) 822. The computer module 802 also includes a number of Input/Output (I/O) interfaces, for example I/O interface 824 to the display 808, and I/O interface 826 to the keyboard 804.

The components of the computer module 802 typically-communicate via an interconnected bus 828 and in a manner known to the person skilled in the relevant art.

The application program is typically supplied to the user of the computer system 800 encoded on a data storage medium such as a CD-ROM or floppy disk and read utilising a corresponding data storage medium drive of a data storage device 830. The application program is read and controlled in its execution by the processor 818. Intermediate storage of program data maybe accomplished using RAM 820.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for inter-mode prediction in video coding, the method comprising:
checking a data block of an image for zero motion;
computing frame difference of the data block based on the checking for zero motion; and
making an inter-mode prediction selection based on the computed frame difference,
wherein the inter-mode prediction selection comprises selecting a block size for coding, based on the computed frame difference;
checking a homogeneity of the data block; and
making the inter-mode prediction selection based on the checking of the homogeneity of the data block;
wherein making the inter-mode prediction selection further based on the checking of the homogeneity of the data block further comprises making the inter-mode selection based on intra-mode prediction selection, and wherein the intra-mode prediction selection comprises a vertical versus horizontal intra-mode prediction selection.

2. The method as claimed in claim 1, wherein the vertical versus horizontal intra-mode prediction selection comprises generating edge directional information of the image, and detecting the direction of one or more edges of the image.

3. The method as claimed in claim 1, wherein the intra-mode prediction selection is conducted prior to checking the data block of the image for zero motion.

4. The method as claimed in claim 1, further comprising making the inter-mode prediction selection further based on checking of the homogeneity of subtypes of the data block.

5. The method as claimed in claim 1, further comprising performing motion estimation on different selected block sizes based on the inter-mode prediction selection.

6. The method as claimed in claim 1, further comprising performing rate distortion optimization on different selected block sizes based on the inter-mode prediction selection.

7. The method as claimed in claim 1, wherein the step of checking the data block for zero motion comprises checking if a collocated previous data block has zero motion vector.

8. A system for inter-mode prediction in video coding, the system comprising:
a motion detection unit checking a data block of an image for zero motion; and
a processor unit computing frame difference of the data block based on the checking for zero motion; and making an inter-mode prediction selection based on the computed frame difference,
wherein the inter-mode prediction selection comprises selecting a block size for coding, based on the computed frame difference;
a homogeneity detection unit checking a homogeneity of the data block, and
the processor unit further makes the inter-mode prediction selection based on the checking of the homogeneity of the data block;
wherein, in making the inter-mode prediction selection based on the checking of the homogeneity of the data block, the processor unit further makes the inter-mode selection based on intra-mode prediction selection, and wherein the intra-mode prediction selection comprises a vertical versus horizontal intra-mode prediction selection.

9. The system as claimed in claim 8, wherein the vertical versus horizontal intra-mode prediction selection comprises generating edge directional information of the image, and detecting the direction of one or more edges of the image.

10. The system as claimed in claim 8, further comprising making the inter-mode prediction selection based on checking of the homogeneity of subtypes of the data block by the homogeneity detection unit.

11. The system as claimed in claim 8, wherein the processor unit further performs motion estimation on different selected block sizes based on the inter-mode prediction selection.

12. The system as claimed in claim 8, wherein the processor unit further performs rate distortion optimization on different selected block sizes based on the inter-mode prediction selection.

13. The system as claimed in claim 8, wherein the motion detection unit checks if a collocated previous data block has zero motion vector to check for zero motion of the data block.

14. A non-transitory data storage medium having stored thereon computer readable code means for instructing a computer to execute a method for inter-mode prediction in video coding, the method comprising:
checking a data block of an image for zero motion;
computing frame difference of the data block based on the checking for zero motion; and making an inter-mode prediction selection based on the computed frame difference,
wherein the inter-mode prediction selection comprises selecting a block size for coding, based on the computed frame difference;
checking a homogeneity of the data block, and
making the inter-mode prediction selection based on the checking of the homogeneity of the data block;
wherein the making the inter-mode prediction selection further based on the checking of the homogeneity of the data block further comprises making the inter-mode selection based on intra-mode prediction selection, and wherein the intra-mode prediction selection comprises a vertical versus horizontal intra-mode prediction selection.

15. The data storage medium as claimed in claim 14, wherein the method further comprises making the inter-mode prediction selection based on checking of the homogeneity of subtypes of the data block by the homogeneity detection unit.

16. The data storage medium as claimed in claim 14, wherein the checking the data block for zero motion comprises checking if a collocated previous data block has zero motion vector.

* * * * *